US009139043B1

(12) United States Patent
Fan

(10) Patent No.: US 9,139,043 B1
(45) Date of Patent: Sep. 22, 2015

(54) CENTRAL-CONTROLLED DOUBLE WHEEL STRUCTURE

(71) Applicant: Tso-Yu Fan, Changhua (TW)

(72) Inventor: Tso-Yu Fan, Changhua (TW)

(73) Assignee: DER SHENG Co. Ltd., Changhua (TW)

( * ) Notice: Subject to any disclaimer, the term of this patent is extended or adjusted under 35 U.S.C. 154(b) by 0 days.

(21) Appl. No.: 14/260,113

(22) Filed: Apr. 23, 2014

(51) Int. Cl.
*B60B 33/06* (2006.01)
*B60B 33/00* (2006.01)

(52) U.S. Cl.
CPC ......... *B60B 33/0028* (2013.01); *B60B 33/0047* (2013.01)

(58) Field of Classification Search
CPC . Y10T 16/195; Y10T 16/196; B60B 33/0078; B60B 33/0086; B60B 33/02; B60B 33/021; B60B 33/023; B60B 33/025; B60B 33/0042; B60B 2301/046; B60B 2301/0463; B60B 2301/0465; B60B 2301/0467; A61G 2007/0528
See application file for complete search history.

(56) References Cited

U.S. PATENT DOCUMENTS

| 4,677,706 A * | 7/1987 | Screen ........................... 16/35 R |
| 5,014,391 A * | 5/1991 | Schulte ......................... 16/35 R |
| 5,133,106 A * | 7/1992 | Milbredt et al. .............. 16/35 R |
| 5,139,116 A * | 8/1992 | Screen ........................... 188/1.12 |
| 5,303,450 A * | 4/1994 | Lange ............................ 16/35 D |
| 5,503,416 A * | 4/1996 | Aoki et al. .................. 280/79.11 |
| 6,360,851 B1 * | 3/2002 | Yang ............................. 188/1.12 |
| 6,584,641 B1 * | 7/2003 | Milbredt ....................... 16/35 R |
| 6,834,746 B1 * | 12/2004 | Lin ............................... 188/1.12 |
| 7,810,613 B2 * | 10/2010 | Lin ............................... 188/1.12 |
| 7,992,254 B2 * | 8/2011 | Ahn et al. ..................... 16/35 R |
| 8,050,657 B2 * | 11/2011 | Hollander .................... 455/411 |
| 8,051,533 B2 * | 11/2011 | Block et al. .................. 16/35 R |
| 8,365,353 B2 * | 2/2013 | Block et al. .................. 16/35 R |
| 8,499,413 B1 * | 8/2013 | Tsai .............................. 16/35 R |
| 2008/0115324 A1 * | 5/2008 | Block et al. .................. 16/35 R |
| 2011/0120815 A1 * | 5/2011 | Frolik et al. ................. 188/1.12 |

* cited by examiner

*Primary Examiner* — Chuck Mah
(74) *Attorney, Agent, or Firm* — Che-Yang Chen; Law Office of Michael Chen

(57) ABSTRACT

A central-controlled double wheel structure allows accurate performance in controlling the direction of movement of transporting devices when a braking block, a direction limiting member, and a toothed braking member are stably and properly intermeshed, thereby ensuring transporting devices to move in a preset straight direction. The double wheel structure has braking pads that are connected to bridging plates which are in turn connected to a connecting seat, and positioning of the braking pads is controlled by the upward or downward movement of the connecting seat as the bridging plates act as a lever structure with the axial rod as the axis. Further, the serrated cogging ends of the braking pads may intermesh into the cogging teeth of the wheel bodies to effectively stop the movement of transporting devices without subjecting the braking pads and the wheel bodies to extensive wearing.

10 Claims, 8 Drawing Sheets

CENTRAL-CONTROLLED DOUBLE WHEEL STRUCTURE

FIELD OF INVENTION

The present invention relates to a wheel structure, more specifically a central-controlled double wheel structure.

BACKGROUND OF THE INVENTION

Most conventional wheel structure allows only for braking, and only a small portion used for medical purposes may allow wheel structure move toward a straight direction. However, although both the direction positioning component and the braking component of these specialized carts are usually installed to the wheel structure and are operated by foot pedals, the direction positioning component however needs to be controlled separately from the braking component, which is rather inconvenient. A different type of wheel structure that is commercially available have an improved controlling structure which allows the wheel structure to rotate freely, to move in a preset straight direction, and to be stopped by a braking operation, and thus the transporting devices equipped with this type of improved wheel structure possesses desirable features for practical purposes. However, this improved wheel structure is braked by the fraction force generated when the braking pads contact the surfaces of a wheel bodies, and the wearing caused by the braking operation, especially as the braking operation is frequently needed, will reduce the thickness of the braking pads as well as the wheel bodies and then increase the gap between the functioning surfaces of the braking pads and the wheel bodies. As a result, the efficiency of the braking operation will be reduced and transporting devices equipped with this type of wheel structure may not be effectively stopped as the braking components may not function properly after being used for a certain period of time. To solve this problem, the wheel structure has to be replaced for normal braking performance, which is inconvenient, time- and labor-consuming, and may incur extra monetary costs. Therefore, there remains a need for a new and improved wheel structure to overcome the problems stated above.

SUMMARY OF THE INVENTION

As previously described, the wheel bodies of the current commercial available wheel structures are subjected to severe wear caused by fraction between the braking pads and the wheel bodies when the braking operation is frequently needed, which reduces the thickness of the baking pads and the wheel bodies and increases the gap between the surfaces of the wheel bodies and the braking pads. As a result, the braking operation may not be properly performed as the braking pad may not properly contact the surface of the wheel body and the transporting devices equipped with this wheel structure may not be stopped effectively. This defect may be corrected by replacing the non-functional wheel, however it may incur extra costs and is inconvenient in practical uses. The present invention provides a central-controlled double wheel structure with novel structural design, increased structural strength, and desirable stability that solves the above-mentioned problems of current wheel structure.

The central-controlled double wheel structure may include an upper base, a lower base, a braking component, a control component, and an aluminum control rod, wherein the upper case further comprises a partitioning board which separates the space into two opposing assembling compartments located at both sides of the central partitioning board, and the partitioning board has an axial hole that connects these two opposing assembling compartments. Each of the two opposing assembling compartments is installed with a braking pad, with one end of the braking pad extending outwards to form a serrated cogging end with a continuously serrated edge, and the other end having a coupling hole. Further, the other end of the upper base has an uprightly placed slot and a through hole which is laterally opened at the wall connects the two opposing assembling compartments and the uprightly placed slot. The lower base is assembled to the bottom portion of the upper base, and comprises two connecting boards which are each interposed into one of the two opposing assembling compartments. The two connecting boards each has an axial through hole corresponding to the position of the axial hole located at the central partitioning board, and the axial through holes of the two connecting boards and the axial hole of the central partitioning board are connected with a central rod that links the two connecting boards and the central partitioning board together. In addition, two wheel bodies are assembled to the outer ends of the central rod at the outer side of each connecting board, and each wheel body has a set of toothed cogging teeth located at the inner wall corresponding to the position of the serrated cogging end of the braking pad of the upper base. In addition, the further end of the lower base has a convex supporting portion for the components located within the slot to reside on. The braking component comprises a braking block, a direction limiting member, a braking member, and a connecting seat, which are interposed into the slot of the upper base from the bottom following the order as above mentioned. The braking block has a head portion, with the top end of the head portion being formed into a non-circular assembling hole. The braking block also comprises two recessed position restricting portions and two toothed cogging portions located at the bottom edge of the head portion, a cone-shaped pole member extending downwards from the center region of the bottom end of the head portion, and the bottom end of the cone-shaped pole member is connected to a fixing seat which is fitted into a first spring. The direction limiting member has a through hole located in its center which allows the cone-shaped pole member to pass through, two direction positioning convex portions located at two sides of the direction limiting member, and these direction positioning convex portions each has a bulged position limiting portion located at their upper surfaces. The bottom end of the direction limiting member is fitted into a second spring. The toothed braking member has a through hole in its center that allows the cone-shaped pole member to pass through, two recessed slots located at two sides of the toothed braking member which allow the interposition of the two convex direction positioning portions of the braking member, and toothed portions located at the inner wall of the toothed braking member corresponding to the positions of the toothed cogging portions of the braking block. The connecting seat resides onto the supporting portion of the lower base with its bottom portion fitted into a fourth spring, has a top surface that allows the second spring and the third spring to reside against and a convex supporting portion located at the center of the top surface, and has two connecting plates that are located at one side of the connecting seat and are extended into the two opposing assembling compartments of the upper case from the through hole with each connecting plate being connected with a braking pad. The control component comprises a post member, the lower end of the post member is interposed into the uprightly placed slot of the upper case facilitated with two bearings, and the top end of the post member has a ring slot and a through hole across the top end with threaded openings. The post member is formed with a central axial hole along its length, the bottom end of the post member is formed into a non-circular structure which allows it to be interposed into the assembling hole of the braking block, the top end is fitted into an elastic member and is fixedly connected with a connecting member, and the connecting member is mounted with a fixing block which has on its top side a recessed slot, and the recessed slot allows the interposition of a portion of a round pillar member with a certain volume of the pillar member remains outside of the recessed slot. The aluminum control rod comprises two housing members which are assembled opposing to each other, and encloses the control component into the space formed with the two housing members. In addition, the top end of the aluminum control rod has a laterally placed through hole, and a chamber formed inside of the aluminum control rod. The chamber has a bulged position limiting stopper point located at its top side, and is installed with an adjusting member. The adjusting member has a non-circular opening that opens towards the through hole of the aluminum control rod, a recessed cogging portion and a direction-limiting slot that are located at the bottom end of the adjusting member, and convex braking portions that are located at the left and right sides of the adjusting member. The above is a brief description of the structural characteristics of the central-controlled double wheel structure of the present invention.

The above described structural design of the central-controlled wheel structure of the present invention provides multiple advantages over conventional ones. For example, the cooperated function of the braking block of the braking component together with the direction limiting member and the toothed braking member to allows the wheel structure to achieve proper relative positioning of the upper base and the control component. Further, the position limiting bulged portion of the positioning member and the cogging portions of the toothed braking member mutually restrict each other's positioning, together with the intermeshing effects between the position limiting bulged portion and the position limiting recessed portions of the braking block, as well as between the cogging portions and the toothed cogging area of the braking member, allow the direction limiting member, and the toothed braking member to be stably intermeshed, which in turn increases the performance accuracy of the direction positioning structure, and ensures the central-controlled double wheel structure to move strictly following a preset straight direction, without being distracted by external forces.

Also, the braking pads that are installed between the upper base and the lower base are connected to the bridging plates, and as a result the positioning of the braking pads can be controlled of the upward or downward movement of the connecting seat. This is achieved as the partitioning board of the upper base has an axial hole which allows the interposition of an axial rod to connect with the bridging plates, and therefore the bridging plates may act as a lever structure and undergo rotational movement with the axial rod as the axis. Further, the wheel bodies of the lower base have a set of cogging teeth located at the inner walls of the wheel bodies corresponding to the positions of the serrated card ends of the braking pads, allowing the serrated cogging ends of the braking pads to be intermeshed into the sets of cogging teeth of the wheel bodies to effectively stop the rotational movement of the wheel bodies. Further, the structural components involved in the braking operation are not subjected to wearing, and as a result the central-controlled double wheel structure of the present invention has an extensively increased life span which is highly desirable in practical uses.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
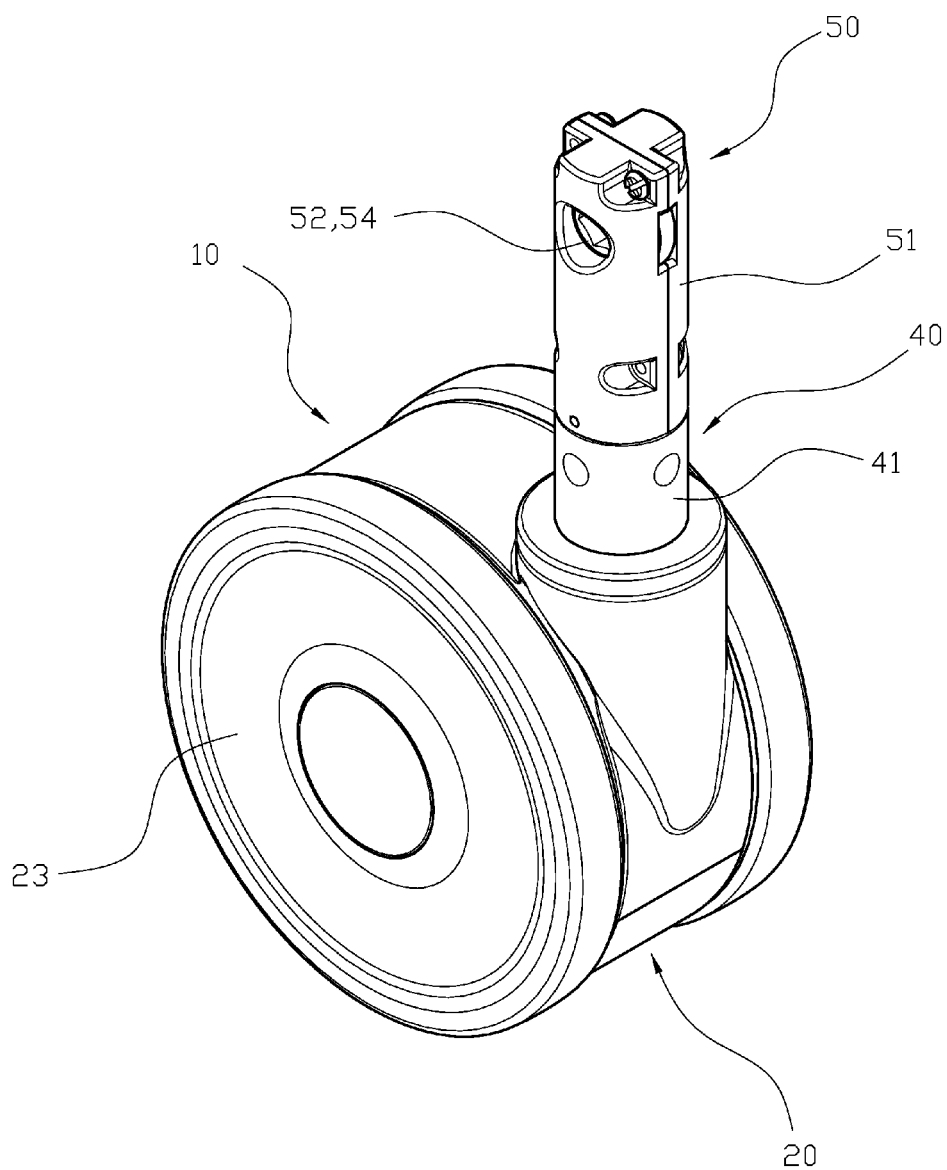
FIG. 1 is a perspective view of the central-controlled double wheel structure of the present invention.
Figure 2:
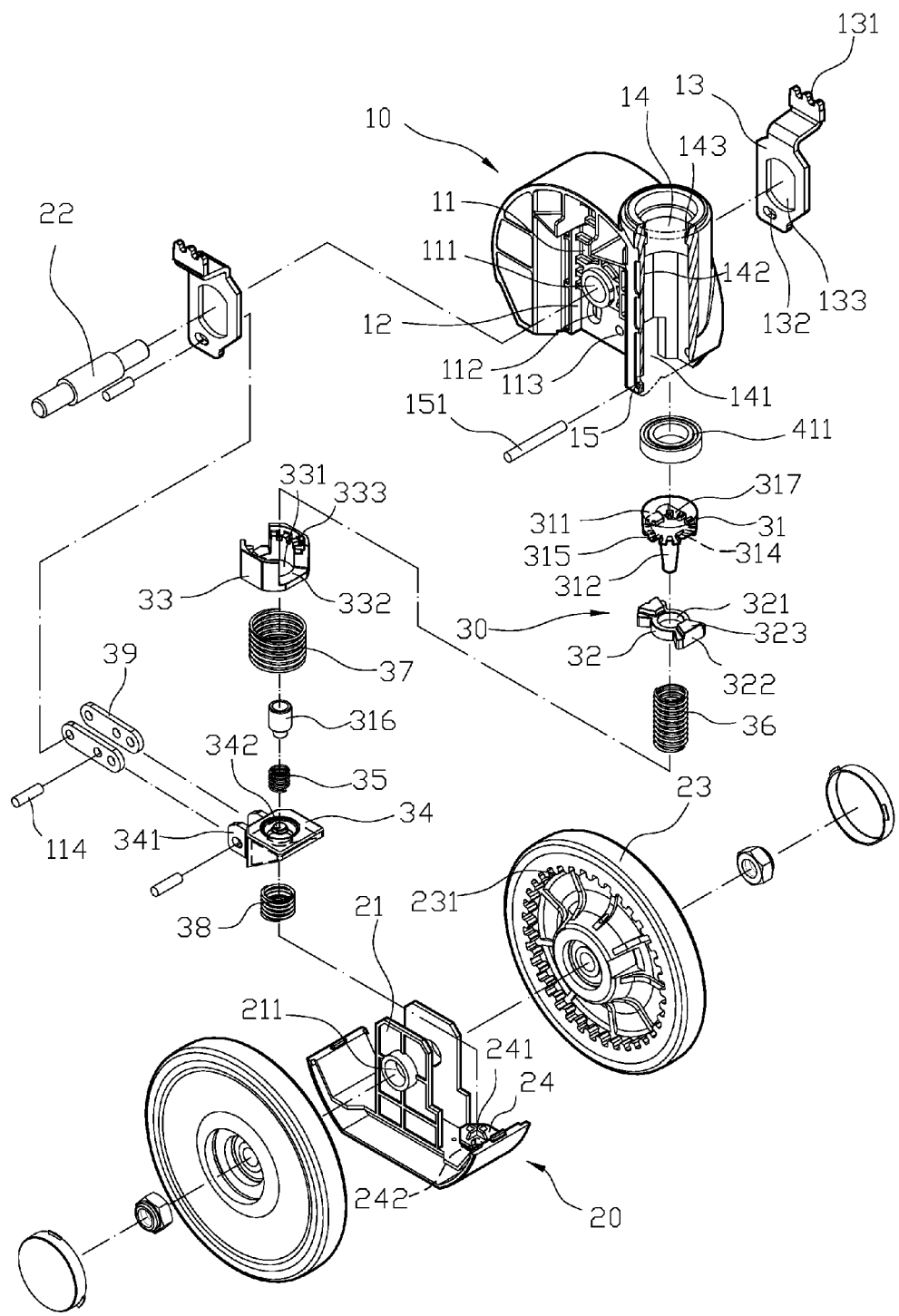
FIG. 2 is an exploded view of the upper base, the lower base, and the braking component of the central-controlled double wheel structure of the present invention.
Figure 3:
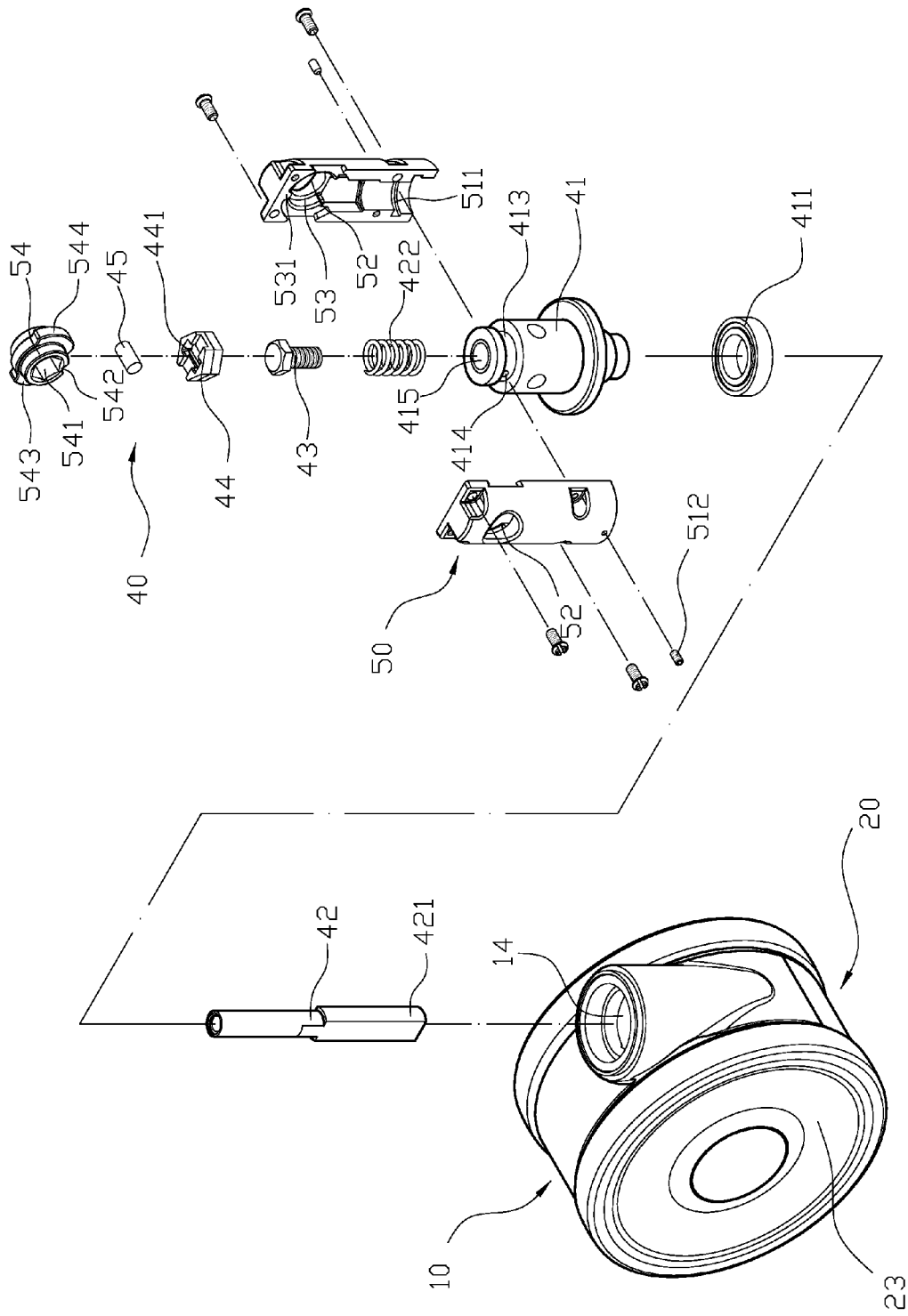
FIG. 3 is an exploded view of the control component and the aluminum control rod of the central-controlled double wheel structure of the present invention.

The objective of the present invention, the characteristics, and benefits of the central-controlled double wheel structure of the present invention are described in detail as following:

Referring to FIGS. 1 to 3, the central-controlled double wheel structure may include an upper base 10, a lower base 20, a braking component 30, a control component 40, and an aluminum control rod 50. The upper base 10 further comprises a partitioning board 11, two compartments 12 separated by the partitioning board 11, and the partitioning board 11 has a central hole 111 which connects the two compartments 12. Each of the two compartments 12 holds a braking pad 13, one end of which extends outwards and forms a serrated cogging end 131, and the other end has a coupling hole 132. Also, a through hole 133 is formed on corresponding to the position of the central hole 111 of the upper base 10. Furthermore, the upper base 10 has an uprightly placed slot 14 at one side, and a through slot 141 that connects the slot 14 to the two compartments 12. The lower base 20 is installed to the bottom portion of the upper base 10 and comprises two connecting boards 21 which are interposed into the two opposing compartments 12 of the upper base 10 with the partitioning board 11 of upper base 10 being placed between these two connecting boards 21, and each of the two connecting boards 21 has an axial through hole 211 corresponding to the central hole 111. The axial through holes 211 of the connecting boards 21 and the central hole 111 of the partitioning board 11 are connected with a central rod 22, and each outer end of the central rod 22 is connected with a wheel body 23 which has a set of cogging teeth 231 located at the inner side of wheel body 23 corresponding to the positions of the serrated cogging end 131 of the braking pads 13. In addition, the lower base 20 has a supporting portion 24 corresponding to the slot 14, and the supporting portion 24 further comprises a restricting rib 241 at a top portion thereof and a connecting portion 242 at a lower portion thereof. The upper base 10 has a connecting hole 15 corresponding to the connecting portion 242 of the supporting portion 24, and the connecting hole 15 is connected with a shaft rod 151.

The braking component 30 may include a braking block 31, a direction limiting member 32, a toothed braking member 33, and a movable connecting seat 34, which are installed into the slot 14 of the upper base 10 from the bottom following the above-mentioned order. The braking block 31 comprises a head portion 311, a cone-shaped pole member 312 extending downwards from the center of the bottom side of the head portion 311, and the position-limiting wall structure 313. In addition, the top side of the head portion 311 has a non-circular assembling hole 317, the bottom edge of the head portion 311 is carved to form recessed positioning portions 314 and toothed cogging portions 315, and the braking block 31 further comprises a holding member 316 that holds the bottom end of the cone-shaped pole member 312, and the holding member 316 is connect to a first spring 35. The direction limiting member 32 has a through hole 321 at a center portion thereof, which allows the cone-shaped pole member 312 to pass through, and two positioning portions 322 are located at two sides of the direction limiting member 32. Each positioning portion 322 has a position limiting bulged block 323 located at the top side of the positioning portion 322 corresponding to the locations of the recessed position limiting portions 314 of the braking block 31. The toothed braking member 33 has in its center a through hole 331 which allows the cone-shaped pole member 312 of the braking member 31 to pass through, two holding slots 332 opened at both sides which hold the positioning portions 322 of the direction positioning member 32, and toothed cogging portions 333 that are located at the inner wall of the toothed braking member 33 corresponding to the positions of the toothed cogging portions 315 of the braking member 31. The bottom of the direction positioning member 32 is fitted into a second spring 36, the bottom of the toothed braking member 33 is fitted into a third spring 37, and both the positioning member 32 and the toothed braking member 33 reside against the inner side wall 142 of the slot 14 of the upper base 10. The connecting seat 34 has two connecting members 341 extending from one side of the connecting seat into the two opposing compartments 12 of the upper base 10 via the through slot 141 of the upper base 10, allowing the connecting seat 34 to be connected to the braking pads 13 of the upper case 10 as being linked with two bridging plates 39. Each bridging plate 39 has three holes along its length, with the one closer to the connecting seat 34 being connected to the connecting member 341, the one at the further end being connected to the through hole 132 of the braking pad 13 with a connecting rod that also passes through an opening 112 located at the partitioning board 11, and the one in the center being connected to the axial hole 113 with an axial rod 114 which serves as the axis for the rotational movements of the bridging plates. The connecting seat 34 also has a protruding portion 342 located at the center of the top side and the protruding portion 342 functions in limiting the positioning of the first spring 35 that is fitted to the bottom end of the holding member 316. Further, the surface of the top side of the connecting seat 34 outside of the protruding portion 342 also serves for the second spring 36 and the third spring 37 to reside against, and as the second spring 36 is lengthier and slenderer than the third spring 37 the second spring 36 is therefore allowed to pass through the through hole 331 of the braking member 33 and to push against the positioning member 32 and maintain the positioning member 32 to be floating and at a same height to the toothed cogging portions 333 within the inner space of the braking member 33. The control component 40 comprises a post member 41, wherein the lower end of the post member 41 is inserted into the slot 14 of the upper base 10 with the support of two bearings 411, and the positioning of the post member 41 is restricted by the position limiting convex portions 143 located at the inner wall of the slot 14 corresponding to the position of the bearings 411 of the post member 41. When the post member 41 is installed into the slot 14 of the upper base 10, the end portion of the lower end of the post member 41 is riveted to form bended riveting portions 412 that extend laterally and function in restricting the positioning of the post member 41. The top end of the post member 41 has a ring slot 413, and a threaded hole 414 located in the ring slot 413. The post member 41 has an axil through hole 415 along its length which allows an axial rod 42 to pass through, and the axial rod 42. The axial rod 42 has its lower end formed into a non-circular structure that is fitted into the non-circular opening 317 of the braking block 31, and its upper end enclosed with a spring member 422 and installed with a connecting member 43. The head portion of the connecting member 43 is fitted into a fixing block 44 and the fixing block 44 has a recessed slot 441 located at its top end which allows the interposition of a portion of a pillar member 45 with the rest volume of the pillar member 45 protruding out from the recessed slot 441. The aluminum control rod 50 comprises two housing members 51 which are assembled to from a cylindrical structure that encloses the control component 40, wherein the inner walls of the two housing members 51 have bulged portions 511 that can be inserted into the recessed ring slot 413 for increased assembling stability, and the connection between the control component 40 and the aluminum control rod 50 can be further strengthened with a locking member 512 installed into the threaded hole 414 located in the ring slot 413 of the post member 41 of the control component 40. The top end of the aluminum control rod 50 has a horizontal opening 52 which opens to a chamber 53 formed inside of the aluminum control rod 50, and the chamber 50 has a bulged stopper portion 531 on its top side and is installed with an adjusting member 54. The adjusting member 54 has a non-circular control horizontal opening 541 which is located in its center and opens towards the horizontal opening 52 of the aluminum control rod 50, and the outer edge of the adjusting member 54 has a recessed cogging portion 542 which resides against the pillar member 45 when the described wheel structure is adjusted to function normally and a recessed direction-limiting slot 545 located next to the recessed cogging portion 542, and a convex position-limiting portion 543 and a convex braking portion 544 which are located at the outer sides of the recessed cogging portion 542 and the recessed direction-limiting slot 545 and closer to the top end of the chamber 53.

The assembly of the central-controlled double wheel structure of the present invention is described as following, referring to FIGS. 1 to 4. The post member 41 of the control component 40 is installed into the slot 14 of the upper base 10, the two bearing members 411 of the post member 41 each resides against the top side or the bottom side of the convex position limiting portion 143 located at the inner wall of the slot 14, and the post member 41 is then inserted into and connected with the slot 14, allowing the post member 41 to rotate freely within the slot 14. Further, the lower end of the post member 41 is formed into a riveted edge 412 that extends laterally and partially encloses the bottom side of the lower bearing member 411 which is located underneath the position limiting convex portion 143 located at the inner wall of the slot 14, and this structure acts in increasing the connection strength of the post member 41 into the slot 14. The braking component 30 is installed into the slot 14 between the control component 40 and the lower base 20, wherein the braking block 31, the direction limiting member 32, the toothed braking member 33, and the connecting seat 34 are interposed from the bottom in the above-mentioned order into the slot 14, and the cone-shaped pole member 312 of the braking block 31 is allowed to pass through the through hole 321 of the direction limiting member 32, and then the through hole 331 of the braking member 33, and the end of the cone-shaped pole member 312 is interposed into the holding member 316. In addition, the lower end of the holding member 316 of the braking block 31 is fitted into a first spring 35 which resides onto the protruding portion 342 of the connecting seat 34, the lower end of the direction limiting member 32 is fitted into the second spring 36, the lower of the braking member 33 is also fitted into a third spring 37, and both the second spring 36 and the third spring 37 reside onto and against the flat surface of the top side of the connecting seat 34. As the second spring 36 is lengthier and slenderer than the third spring 37, the second spring 36 passes through the through hole 331 of the braking member 33 and pushes against and maintains the direction limiting member 32 to be floating within the inner space of the braking member 33 and at a same height relative to the toothed cogging portions 333. Further, the direction limiting member 32 and the braking member 33 both reside against and are positioned by the inner wall 142 of the slot 14, the braking block 31 is restricted by the first spring 35 and the inner wall 142 of the slot 14, which allows space to be present between the recessed positioning portions 314 and the direction limiting member 32 as well as between the toothed cogging portions 315 and the braking member 33 for the relative movement of these components. The connecting portions 341 of the connecting seat 34 extend into the two opposing compartments 12 located at both sides of the partitioning board 11 of the upper base 10, and each is connected to a bridging plate 39 with multiple openings with one linking the bridging plate 39 to the braking pads 13 with a connecting rod that passes through the opening 112 and another one to the axial hole 113 of the partitioning board 11, respectively. The bridging plate 39 has three holes along its length, with the one closer to the connecting seat 34 connecting to the connecting member 341, the one at the further end connecting to the through hole 132 of the braking pad 13, and the one in the center connecting to the axial hole 113 with a axial rod 114 which acts in restricting the positioning of the bridging plates and serves as the axis for the rotational movements of the bridging plates. The lower base 20 is connected to the upper base 10 with a connecting portion 242, and the connecting portion 242 has a connecting hole 15 which allows a shaft rod 151 to connect the connecting portion 242 of the lower base 20 securely to the upper base 10. The installation of the lower base 20 to the upper base 10 is completed by placing the braking component 30 into the slot 14 of the upper base 10, and then by placing the connecting seat 34 which is fitted in to the fourth spring 38 together with the fourth spring 38 onto the supporting portion 24 of the lower base 20. The through holes 211 of the two connecting boards 21 of the lower base 20, the central hole 111 of the partitioning board 11 of the upper base 10, and the through holes 133 of the two braking pads 13 are then aligned and linked with a central rod 22, and the two wheel bodies 23 are installed onto both ends of the central rod 22 next to the two connecting boards 21, allowing the toothed cogging portions 231 of the two wheel bodies 23 to face towards the corresponding serrated cogging end 131 of the braking pad 13. The axial rod 42 of the control component 40 is interposed through the axial hole 415 of the post member 41, and the lower end 421 of the axial rod 42 is inserted into and fixedly connected with the assembling hole 317 of the braking block 31, allowing the braking block 31 to move as being driven by the axial rod 42. The upper end of the axial rod 42 is fitted into a spring member 422 and is screw connected with a connecting member 43, and the connecting member 43 is further connected with a fixing member 44, which has a recessed slot 441 located at its top end. Finally, the two housing members 51 of the aluminum control rod 50 are assembled to enclose the control component 40, and this connection is further strengthened by interposing the bulged portions 511 located at the inner walls of the two housing members 51 into the recessed ring slot 413 of the post member 40 and by applying the locking member 512 through the threaded hole 414. The adjusting opening 541 of the adjusting member 54 which is installed into the chamber 53 of the aluminum control rod 50 opens towards the through hole 52, with the recessed cogging portion 542 located at the bottom end of the adjusting member 54 residing against the top portion of the pillar member 45 for normal function of the described wheel structure. The position of the adjusting member determines the working status of the central-controlled double wheel structure and may be changed by operating the adjusting opening 541 of the adjusting member 54. The moving status of the central-controlled double wheel structure of the present invention, including the moving direction and braking operation, may thus be achieved by manipulating the adjusting member 54 as previously described.

Figure 4:
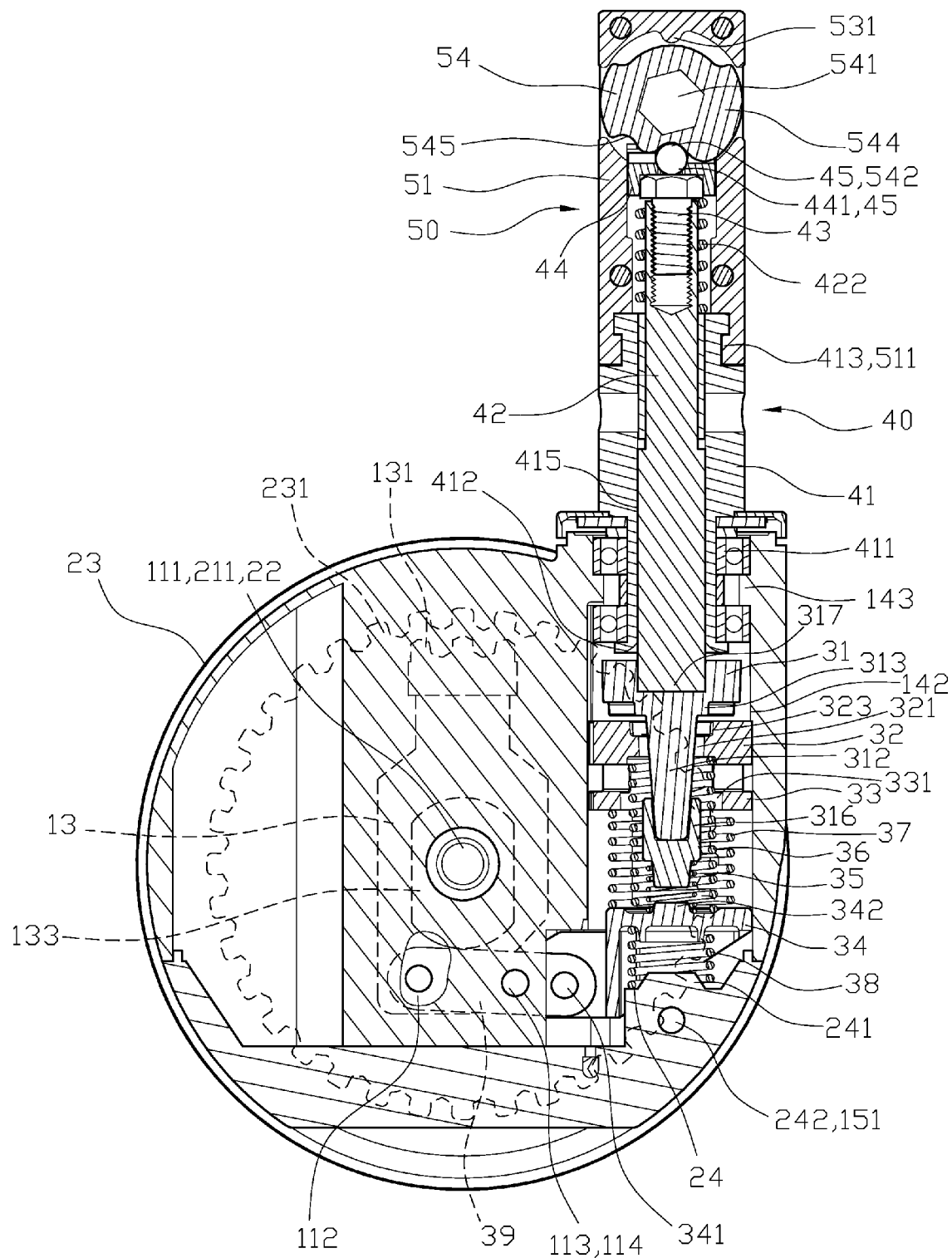
FIG. 4 is a sectional view of the central-controlled double wheel structure of the present invention when it is being normally used.

The structural characteristics of the central-controlled double wheel structure of the present invention when being used is described as following, referring to FIG. 4. For the central-controlled double wheel structure to be normally used, the post member 41 of control component 40 enclosed in the aluminum control rod 50 can be installed to the appropriate portion of a transporting device, and the adjusting member 54 may be rotated with an appropriate adjusting rod (not displayed in the drawings) placed into the adjusting opening 541 of the adjusting member 54, thereby allowing the recessed cogging portion 542 to be placed at the bottom end of the adjusting member 54 and to reside against the top portion of the pillar member 45. As the axial rod 42 of the control component 40 is not pushed down to trigger the action of the braking block 31, the upper base 10 as well as the lower base 20 of the central-controlled double wheel structure may turn freely to change moving directions and the wheel bodies 23 may rotate freely, allowing the central-controlled double wheel structure to perform normal transporting functions.

Figure 5:
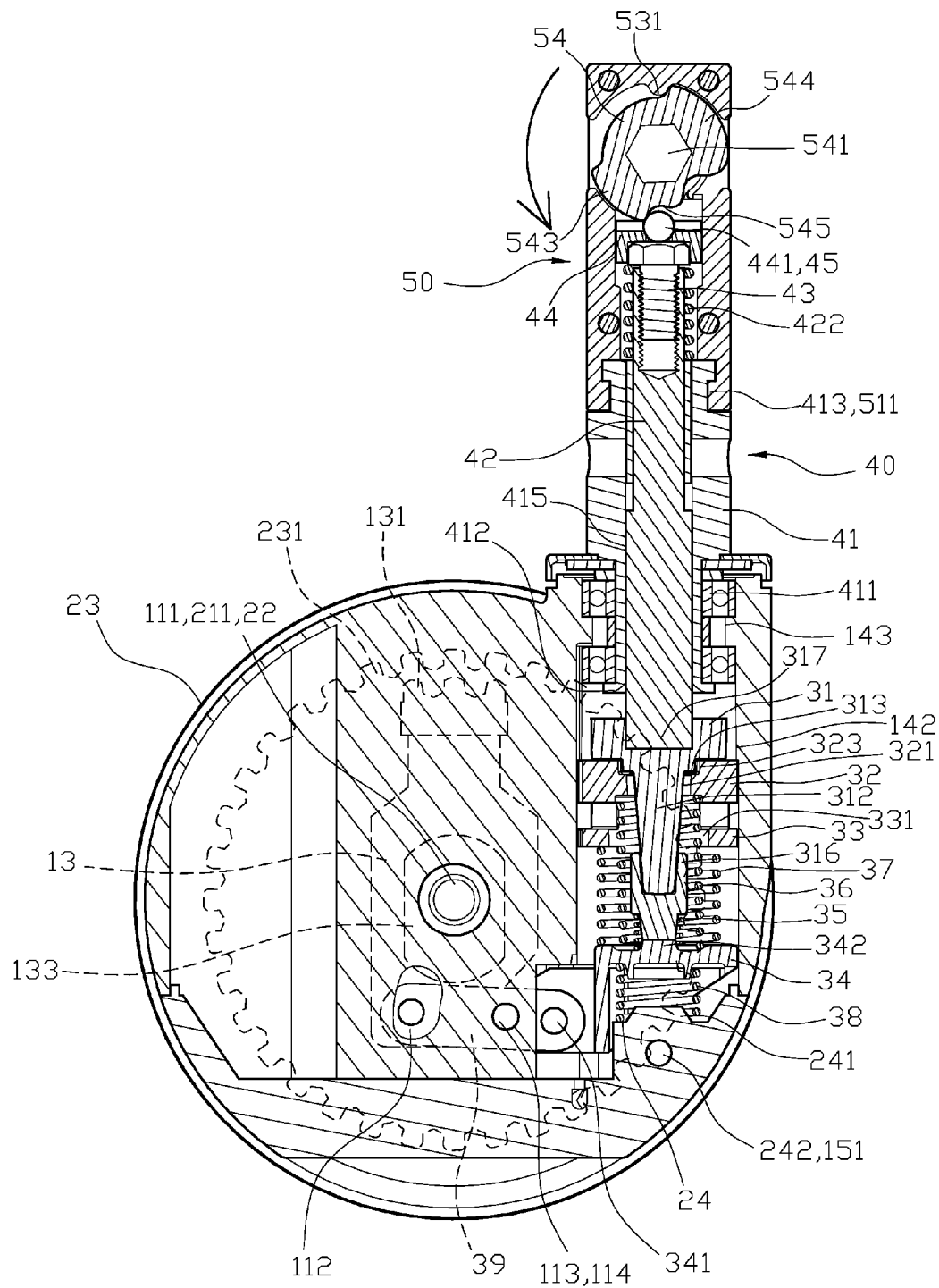
FIG. 5 is a diagram showing the central-controlled double wheel structure of the present invention when it is moving in a specified straight direction.
Figure 6:
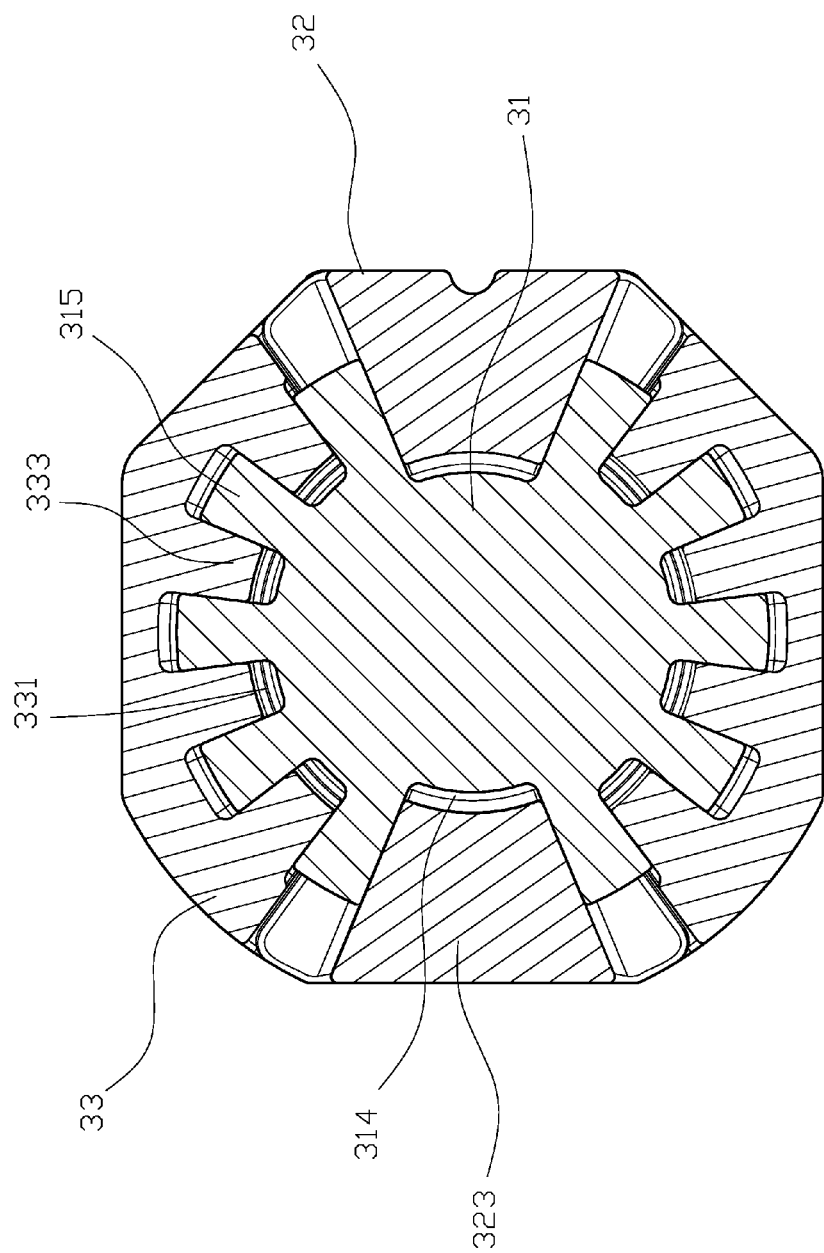
FIG. 6 is a diagram showing the central-controlled double wheel structure of the present invention when it is moving in a specified straight direction.

Further, the central-controlled double wheel structure of the present invention can be adjusted accordingly when it is expected to move only in a certain predetermined straight direction. Referring to FIGS. 5 and 6, the upper base 10 and the lower base 20 may be adjusted to ensure that wheel bodies 23 are properly aligned to the expected direction of movement, and the adjusting member 54 may then be rotated to allow the pillar member 45 to reside against the direction limiting slot 545, and as a result the axial rod 42 is pushed downwards as the direction limiting slot 545 has more depth into the outer wall of the adjusting member 54 than the recessed cogging portion 542. The axial rod 42 then pushes the braking block 31 downwards and the enlarged position-limiting wall structure 313 of the braking block 31 is interposed into the space between the position limiting bulged portion 323 of the positioning member 32, and the position limiting recessed portions 314 as well as the toothed cogging area 315 of the braking member 31 become intermeshed with the position limiting bulged portion 323 of the positioning member 32 as well as the cogging portions 333 of the toothed braking member 33, respectively; therefore further rotational movement of the braking block 31 is prevented by the position limiting effect of the positioning member 32 and the toothed braking member 33, which in turn restricts the central rod 42, the post member 41, and the upper base 10 from relative rotational movement, and as a result allowing the central-controlled double wheel structure of the present invention to move only in a predetermined straight direction.

Figure 7:
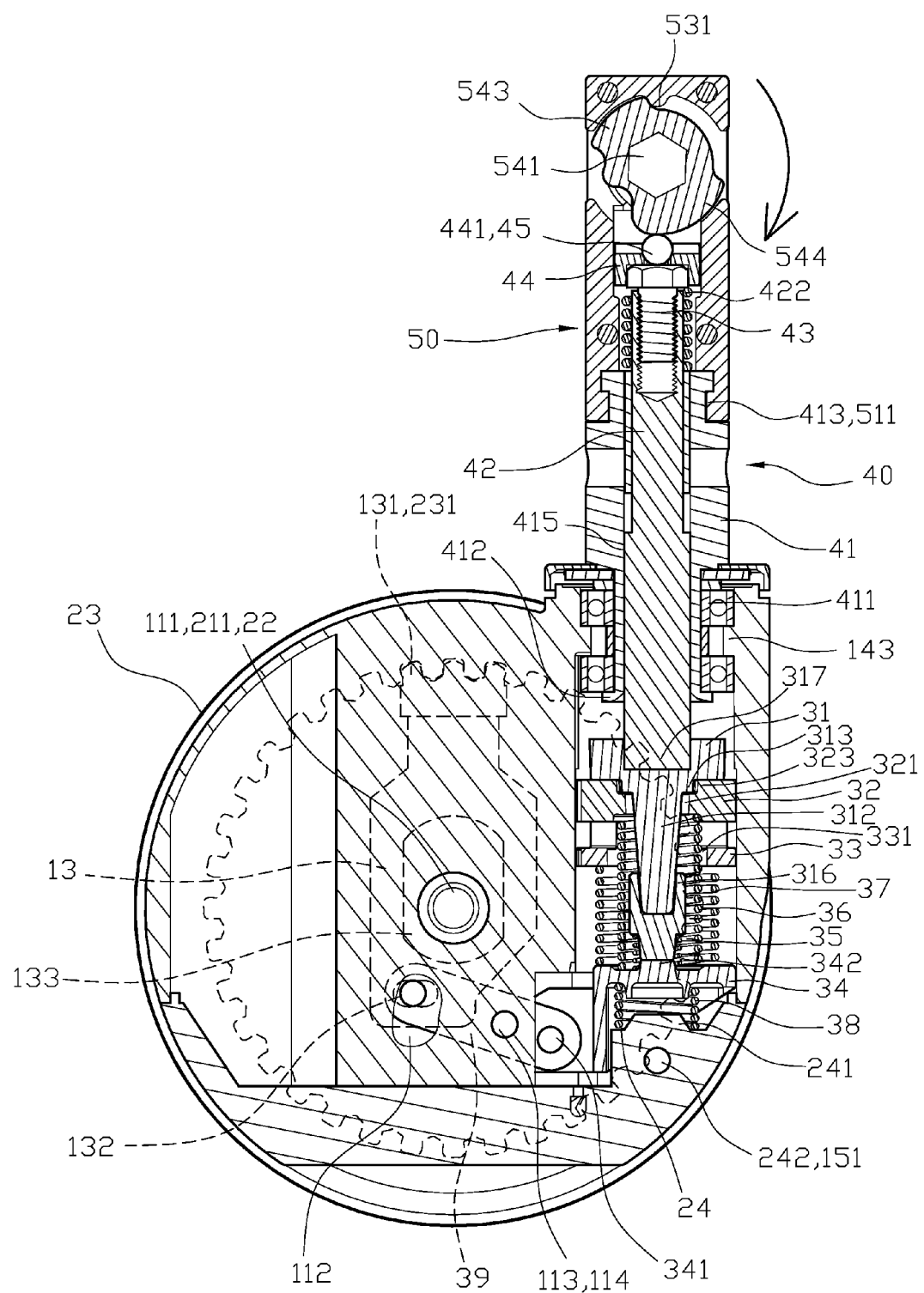
FIG. 7 is a diagram the central-controlled double wheel structure of the present invention when it is stopped by a braking operation.
Figure 8:
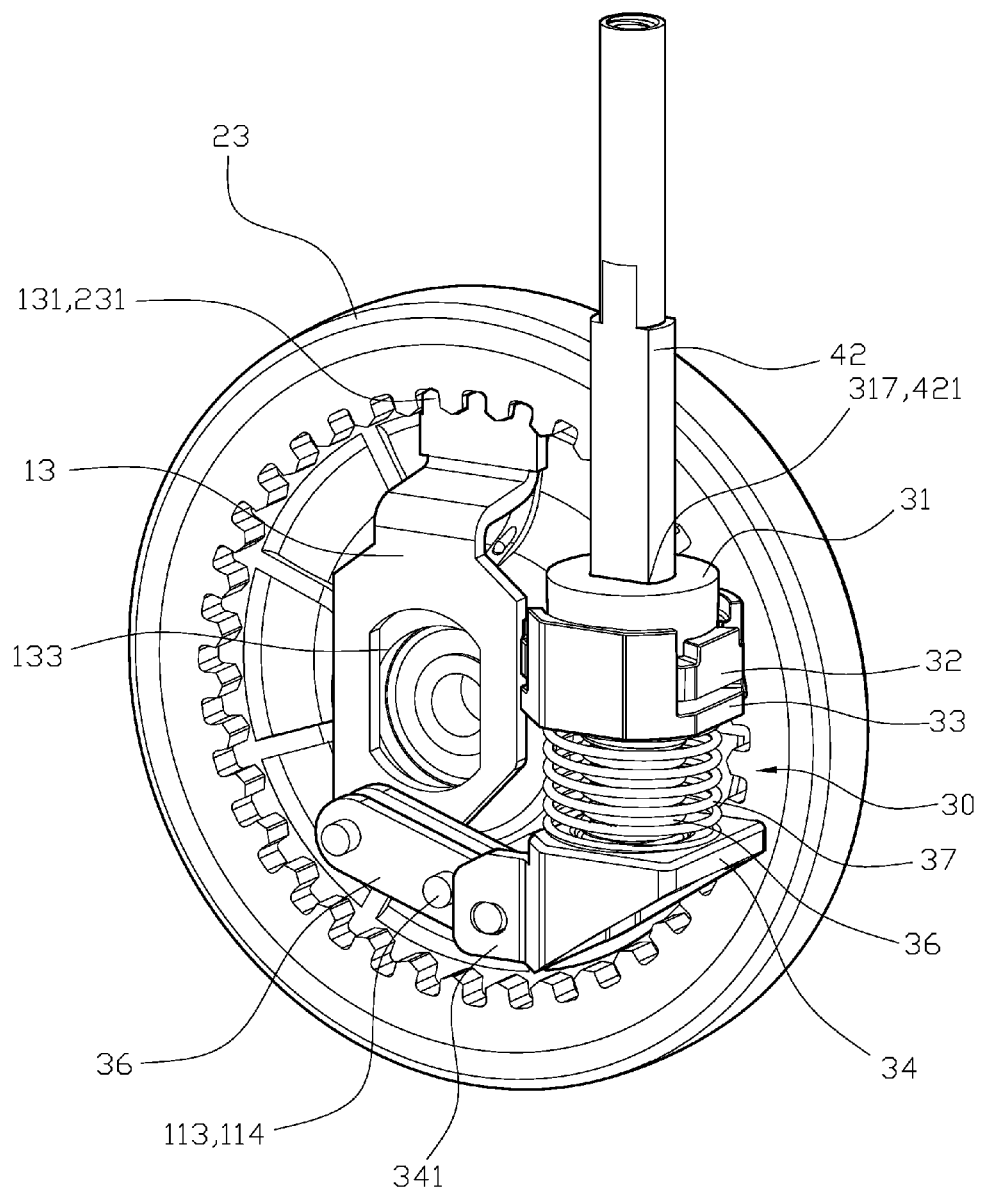
FIG. 8 is a diagram showing the central-controlled double wheel structure of the present invention when it is stopped by a braking operation.

On the other hand, when further movement is no longer needed and a complete stop is expected to prevent the central-controlled double wheel structure of the present invention from unwanted movement, adjustment can be performed as described below referring to FIGS. 7 and 8. The adjusting member 54 may be rotated clock-wisely to allow the convex braking portion 544 of the adjusting member 54 to reside against and push the pillar member 45 further downward as the convex braking portion 544 is not recessed into the outer wall of the adjusting member 54. As a result, the axial rod 42 is pushed further down, allowing the holding member 316 which is installed to the bottom end of the cone-shaped pole member 312 to push and move the connecting seat 34 downwards, and as a result the braking pad 13 of the upper case 10 will be lifted up as the bridging plates 39 act as a lever structure with the axial rod 114 as the axis. Therefore, the serrated cogging ends 131 of the braking pads become intermeshed with the toothed cogging portions 231 located at the inner sides of wheel bodies 23 and this effectively prevents further movement of the wheel bodies thus applies a braking effect to the central-controlled double wheel structure of the present invention. In addition, as previously described, the central-controlled double wheel structure may not turn freely.

The above described structural design of the central-controlled wheel structure of the present invention provides multiple advantages over conventional ones. For example, as the braking block 31 of the braking component 30 functions together with the direction limiting member 32 and the toothed braking member 33 to achieve the relative positioning of the upper base 10 and the control component 40, the bulged position limiting portion 232 of the direction limiting member 32 and the toothed cogging portions 333 of the toothed braking member 33 mutually restrict each other's positioning, together with the intermeshing effects of the bulged position limiting portions 232 with the recessed position limiting portions 314 of the braking block 31 as well as the toothed cogging portions 333 of the toothed braking member 33 with the toothed cogging area 315 of the braking block 31, the structural design of the central-controlled double wheel structure of the present invention allows the braking block 31, the direction limiting member 32, and the toothed braking member 33 to be stably intermeshed, thereby increasing the performance accuracy of the direction positioning structure, and ensuring the central-controlled double wheel structure to move strictly following a preset straight direction, without being distracted by external forces.

Also, the braking pads 13 that are installed between the upper base 10 and the lower base 20 are connected to the bridging plates 39, and can be controlled by the upward or downward movement of the connecting seat 34. This is achieved as the axial hole 113 of the partitioning board 11 of the upper base 10 allows the interposition of an axial rod 114 and the axial rod 114 connects the braking pads 12 to the bridging plates 39, and as a result the bridging plates 39 may undergo rotational movement as a lever structure with the axial rod 114 as the axis, driven by the upward and downward movement of the connecting seat 34 as the other ends of the bridging plates 39 are connected to the connecting seat. Further, the wheel bodies 23 of the lower base 20 have a set of cogging teeth 231 located at the inner walls of the wheel bodies 23 corresponding to the positions of the serrated cogging ends 131 of the braking pads 13, thereby allowing the serrated cogging ends 131 of the braking pads to be intermeshed into the sets of cogging teeth 231 of the wheel bodies 23 to effectively stop the rotational movement of the wheel bodies 23. Further, the structural components involved in the braking operation are not subjected to wearing, and as a result the central-controlled double wheel structure of the present invention has an extensively increased life span which is highly desirable in practical uses.

To summarize, the present invention describes a central-controlled ball wheel structure with a breakthrough in structural design, further improved new components, and advantages in practical use and commercial exploration. The present invention has not been disclosed in any published materials and thus possesses novelty.

The above description and illustrations are for one exemplary embodiment of the present invention and should not be considered to limit the scope of the implementation of the present invention. Accordingly, the present invention is not to be considered as limited by the forgoing description, but includes any equivalents.

What is claimed is:

1. A central-controlled double wheel structure, which comprises:

an upper base, wherein one side of the upper base comprises a partitioning board which separates a space into two opposing assembling compartments located at both sides of the partitioning board, the partitioning board has a central hole that connects these two opposing assembling compartments, each of the two opposing assembling compartments is installed with a braking pad, with one end of the braking pad extending outwards to form a serrated cogging end, and the other end having a coupling hole, the other side of the upper base has an uprightly placed slot and a through hole which is laterally opened at the wall and connects the two opposing assembling compartments to the slot;

a lower base, wherein the lower case is assembled to the bottom portion of the upper base, and comprises two connecting boards, each of the two connecting boards is interposed into an assembling compartments of the upper base and has an axial through hole corresponding to the position of the central hole of the central partitioning board, the axial through holes of the two connecting boards and the central hole of the central partitioning board are connected with a central rod, two wheel bodies are assembled to the outer ends of the central rod at the outside of the connecting boards, and each wheel body has a set of cogging teeth located at the inner wall corresponding to the position of the serrated cogging end of the braking pad of the upper base;

a braking component, wherein the braking component comprises a braking block, a direction limiting member, a toothed braking member, and a connecting seat, which are interposed into the slot of the upper base following the order as above mentioned, the braking block has a head portion with the top end of the head portion being formed into a non-circular assembling hole, two recessed position restricting portions and two toothed cogging portions located at the bottom edge of the head portion, a cone-shaped pole member extending downwards from the center region of the bottom side of the head portion, and the bottom side of the cone-shaped pole member is connected to a holding member which is fitted into a first spring, the direction limiting member has a through hole located in its center which allows the cone-shaped pole member to pass through, two direction positioning convex portions located at two sides of the direction limiting member, and these direction positioning convex portions each has a bulged position limiting portion located at their upper surfaces, the toothed braking member has a through hole in its center that allows the cone-shaped pole member to pass through, two recessed slots located at two sides of the toothed braking member and these recessed slots allow the interposition of the two convex direction positioning portions of the direction limiting member, and toothed portions located at an inner wall of the toothed braking member corresponding to the positions of the toothed cogging portions of the braking block, the connecting seat resides onto a supporting portion of the lower base with its bottom portion which is fitted into a fourth spring, has a top surface that allows the second spring and the third spring to reside against and a convex supporting portion located at the center of the top surface, and also has two connecting plates that are located at one side of the connecting seat and are extended into the two opposing assembling compartments of the upper case from the through hole with each connecting plate being connected with one of the braking pads by a bridge plate;

a control component, wherein the control component comprises a post member, the lower end of the post member is interposed into the slot of the upper case facilitated with two bearings, and the top end of the post member has a recessed ring slot and a through hole across the top end with threaded openings, the post member has a central axial hole along its length and receives an axial rod, the bottom end of the axial rod is formed into a non-circular structure which allows it to be interposed into the assembling hole of the braking block, the top end of the post member is fitted into an elastic member and is fixedly connected with a connecting member, the connecting member is mounted with a connecting block which has on its top side a recessed slot, and the recessed slot receives a portion of a round pillar member with a certain portion of the pillar member remains outside of the recessed slot;

an aluminum control rod, wherein the aluminum control rod comprises two housing members which are assembled opposing to each other, and encloses the control component into the space formed with the two housing members, the top end of the aluminum control rod has a laterally placed through hole, and a chamber formed inside of the aluminum control rod which has a bulged position limiting stopper point located at its top side and is installed with an adjusting member, the adjusting member has a non-circular opening that opens towards the through hole of the aluminum control rod, a recessed cogging portion and a direction-limiting slot that are located at the bottom end of the adjusting member, and convex braking portions that are located at opposite sides of the adjusting member.

2. The central-controlled double wheel structure of claim 1, wherein the partitioning board of the upper base has an axial hole which allows the interposition of an axial rod to connect with the bridging plates, and thus the bridging plates may act as a lever structure and undergo rotational movement with the axial rod as the axis.

3. The central-controlled double wheel structure of claim 1, wherein the supporting portion of lower base further comprises a restricting rib at a top end thereof and a connecting portion at a lower end thereof.

4. The central-controlled double wheel structure of claim 3, wherein the upper base has a connecting hole at the location corresponding to the connecting portion of the supporting portion, and the connecting hole is connected with a shaft rod, which allows the lower base to be installed to the upper base by being rotated upwards with the shaft rod as the axis, and is secured with one or more than one fastening members.

5. The central-controlled double wheel structure of claim 1, wherein the center of the braking pad has a through hole in its center corresponding to the position of the central hole of the upper base.

6. The central-controlled double wheel structure of claim 1, wherein the head portion of the braking block has an enlarged position-limiting wall structure located at the base of the cone-shaped pole member.

7. The central-controlled double wheel structure of claim 1, wherein both the direction limiting member and the toothed braking member reside against the inner side wall of the slot of the upper base, and the positioning of the post member is restricted by position limiting convex portions located at the inner wall of the slot corresponding to the position of the bearings installed into the slot.

8. The central-controlled double wheel structure of claim 1, wherein the second spring is lengthier and slenderer than the third spring thereby allowing the second spring to pass through the through hole of the toothed braking member to push against and maintain the direction limiting member to be floating and at a same height to the toothed cogging portions within the inner space of the toothed braking member.

9. The central-controlled double wheel structure of claim 1, wherein the lower end of the post member is riveted to form bended portions that extend laterally and function in restricting the positioning of the post member after the interposition of the post member in the slot.

10. The central-controlled double wheel structure of claim 1, wherein the two housing members of the aluminum control rod each has a bulged portion located at the inner wall of the housing member and these bulged portions are inserted into the recessed ring slot of the post member for increased connection strength.

* * * * *